(12) United States Patent
Kikuchi

(10) Patent No.: US 12,526,372 B2
(45) Date of Patent: Jan. 13, 2026

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Takazumi Kikuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 516 days.

(21) Appl. No.: 17/893,128

(22) Filed: Aug. 22, 2022

(65) Prior Publication Data

US 2023/0291844 A1 Sep. 14, 2023

(30) Foreign Application Priority Data

Mar. 11, 2022 (JP) ................................ 2022-038166

(51) Int. Cl.
*H04N 1/00* (2006.01)
(52) U.S. Cl.
CPC ..... *H04N 1/00074* (2013.01); *H04N 1/00082* (2013.01)

(58) Field of Classification Search
CPC ...................... H04N 1/00074; H04N 1/00082
See application file for complete search history.

(56) References Cited

U.S. PATENT DOCUMENTS

| 9,955,069 B2 | 4/2018 | Aoyama | |
|---|---|---|---|
| 2013/0321832 A1* | 12/2013 | Sugiyama | .......... H04N 1/00037 358/1.14 |
| 2017/0180598 A1* | 6/2017 | Nagahara | ........... H04N 1/32662 |

FOREIGN PATENT DOCUMENTS

| JP | 2010096357 | 4/2010 |
|---|---|---|
| JP | 2016201626 | 12/2016 |
| JP | 2017154319 | 9/2017 |
| JP | 2018063579 | 4/2018 |

* cited by examiner

*Primary Examiner* — Ibrahim Siddo
(74) *Attorney, Agent, or Firm* — JCIPRNET

(57) ABSTRACT

An information processing apparatus includes a processor configured to acquire information related to a function utilized by a user, and refer to the acquired information and, in a case where a defect occurs in the information processing apparatus and the defect is a defect not affecting the function utilized by the user, do not provide a notification of the defect to the user or provide a notification indicating that the defect does not affect the function utilized by the user to the user.

19 Claims, 7 Drawing Sheets

FIG. 4

| FUNCTION NAME | UTILIZED | NOT UTILIZED |
|---|---|---|
| PRINTING FUNCTION | O | |
| COPYING FUNCTION | O | |
| FAX FUNCTION | | O |
| SCANNING AND FAX FUNCTION | | O |
| SCANNING FUNCTION | | O |

<RETURN

ERROR

SCANNING FUNCTION CANNOT BE CURRENTLY UTILIZED.
PLEASE CONTACT MANAGER.
PRINTING FUNCTION CAN STILL BE UTILIZED.

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-038166 filed Mar. 11, 2022.

BACKGROUND

(i) Technical Field

The present invention relates to an information processing apparatus, a non-transitory computer readable medium storing a program, and an information processing method.

(ii) Related Art

JP2017-154319A discloses a management system that facilitates a response to a trouble using operation information related to troubleshooting for an image forming apparatus when the trouble occurs.

JP2010-096357A discloses an air conditioner system that includes a plurality of indoor units and outdoor units and can display a necessary error display to only a necessary person in accordance with an operation form of service.

JP2018-063579A discloses an apparatus utilization system that enables a user to utilize another apparatus when an apparatus malfunctions even in a case where there is no alternative apparatus on a network to which the apparatus is connected.

SUMMARY

For example, in a case where a user rents an information processing apparatus such as a multifunction peripheral from an organization to which the user belongs in order to work from home, the user renting the information processing apparatus needs to first respond to a notification of an alert indicating a defect from the information processing apparatus.

Even in a case where the defect of the information processing apparatus does not affect a function utilized by the user, the notification of the alert indicating the defect from the information processing apparatus burdens the user such that the user is caused to perform any response or the user feels worried.

Aspects of non-limiting embodiments of the present disclosure relate to an information processing apparatus, a non-transitory computer readable medium storing a program, and an information processing method that can prevent a defect occurring in a function not utilized by a user from burdening the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire information related to a function utilized by a user, and refer to the acquired information and, in a case where a defect occurs in the information processing apparatus and the defect is a defect not affecting the function utilized by the user, do not provide a notification of the defect to the user or provide a notification indicating that the defect does not affect the function utilized by the user to the user.

BRIEF DESCRIPTION OF THE DRAWINGS

Exemplary embodiment(s) of the present invention will be described in detail based on the following figures, wherein:

FIG. 4 is a diagram illustrating an example of a utilized function management table managed in the image forming apparatus of the exemplary embodiment of the present invention;

FIG. 5 is a diagram illustrating a display example of a notification indicating a defect that does not affect a function utilized by a user;

DETAILED DESCRIPTION

Figure 1:
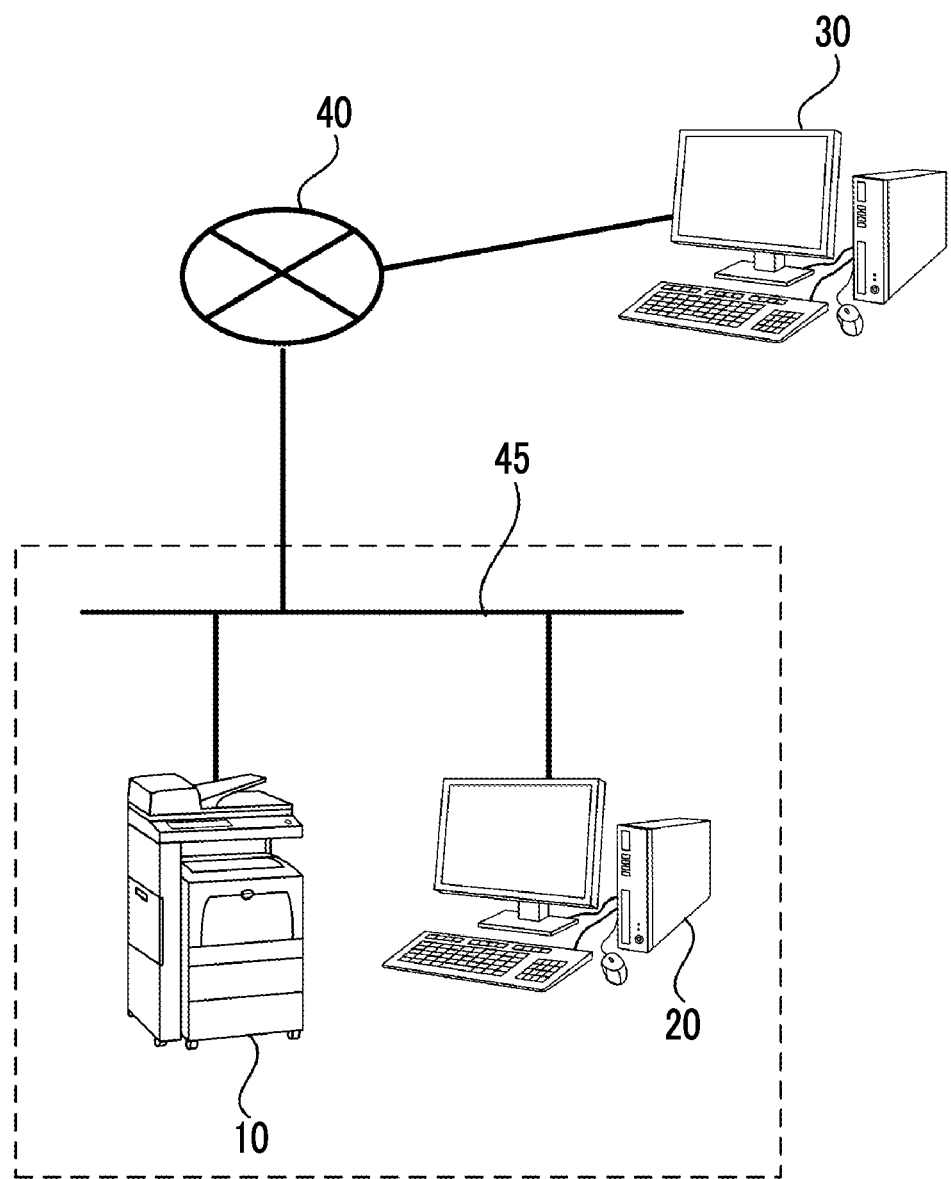
FIG. 1 is a diagram illustrating a system configuration of an image forming system of an exemplary embodiment of the present invention.

Hereinafter, an exemplary embodiment of the present invention will be described in detail with reference to the drawings. FIG. 1 is a diagram illustrating a system configuration of an image forming system of the exemplary embodiment.

As illustrated in FIG. 1, the image forming system of the present exemplary embodiment is configured with an image forming apparatus 10, a terminal apparatus 20, and a terminal apparatus 30.

The terminal apparatus 20 is a terminal apparatus utilized by a user and generates printing data and transmits the generated printing data to the image forming apparatus 10.

The image forming apparatus 10 receives the printing data transmitted from the terminal apparatus 20 and outputs an image corresponding to the printing data on a paper sheet. The image forming apparatus 10 is an apparatus referred to as a so-called multifunction peripheral having a plurality of functions such as a printing function, a scanning function, a copying function, and a facsimile function. The image forming apparatus 10 is an example of an information processing apparatus according to the exemplary embodiment of the present invention.

The terminal apparatus 30 is a terminal apparatus utilized by a manager user and performs maintenance and management for the image forming apparatus 10.

In the image forming system of the present exemplary embodiment, the image forming apparatus 10 is rented to the user from an organization to which the user belongs and is utilized at home of the user. That is, the image forming apparatus 10 and the terminal apparatus 20 are installed at the home of the user. The image forming apparatus 10 and the terminal apparatus 20 are connected to each other through a home network 45 at the home of the user. In addition, the home network 45 and the terminal apparatus 30 are connected to each other through an Internet 40. The manager user performs maintenance and management of the image forming apparatus 10 via the Internet 40 using the terminal apparatus 30 installed at a location different from the home of the user.

Figure 2:
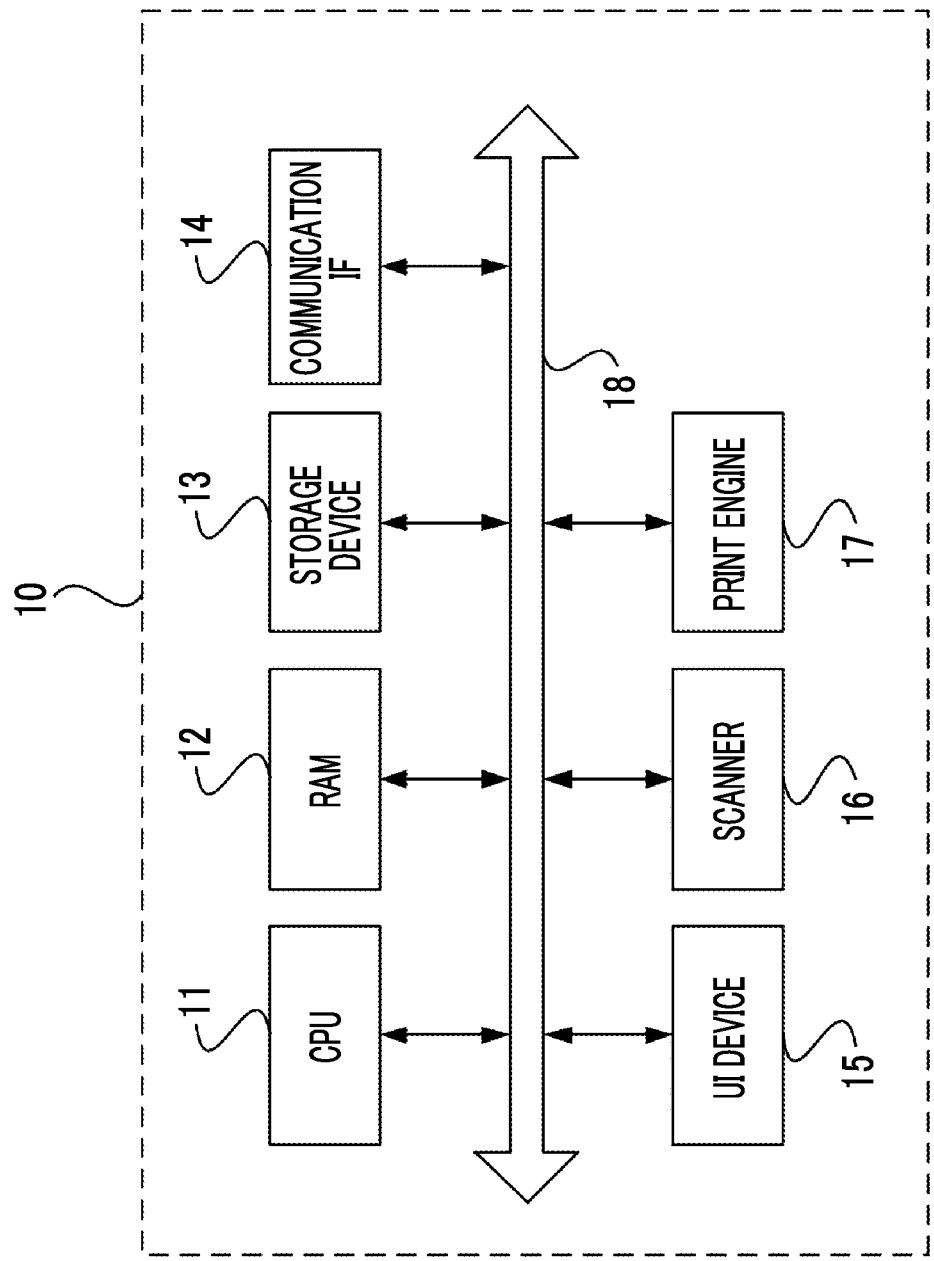
FIG. 2 is a block diagram illustrating a hardware configuration of an image forming apparatus of the exemplary embodiment of the present invention.

Next, a hardware configuration of the image forming apparatus 10 in a data processing system of the present exemplary embodiment is illustrated in FIG. 2.

As illustrated in FIG. 2, the image forming apparatus 10 includes a central processing unit (CPU) 11, a random access memory (RAM) 12, a storage device 13 such as a hard disk drive, a communication interface (abbreviated to IF) 14, a user interface (abbreviated to UI) device 15 including a touch panel or a liquid crystal display and a keyboard, a scanner 16, and a print engine 17.

These constituents are connected to each other via a control bus 18.

The communication IF 14 transmits and receives data to and from an external apparatus or the like via the Internet 40. The UI device 15 receives an instruction input from the user. The scanner 16 scans an original document loaded in the image forming apparatus 10 as image data. The print engine 17 prints an image on a recording medium such as a printing paper sheet through steps of electrostatic charging, exposure, development, transfer, fixing, and the like.

The CPU 11 is a processor that controls an operation of the image forming apparatus 10 by executing a predetermined process based on a control program stored in the RAM 12 or the storage device 13. In the present exemplary embodiment, while the CPU 11 reads and executes the control program stored in the RAM 12 or the storage device 13, the present invention is not limited thereto. The control program may be provided in the form of a recording on a computer readable recording medium. For example, the program may be provided in the form of a recording on an optical disc such as a compact disc (CD)-read only memory (ROM) and a digital versatile disc (DVD)-ROM or in the form of a recording on a semiconductor memory such as a universal serial bus (USB) memory and a memory card. In addition, the control program may be acquired from the external apparatus via a communication line connected to the communication interface 14.

Figure 3:
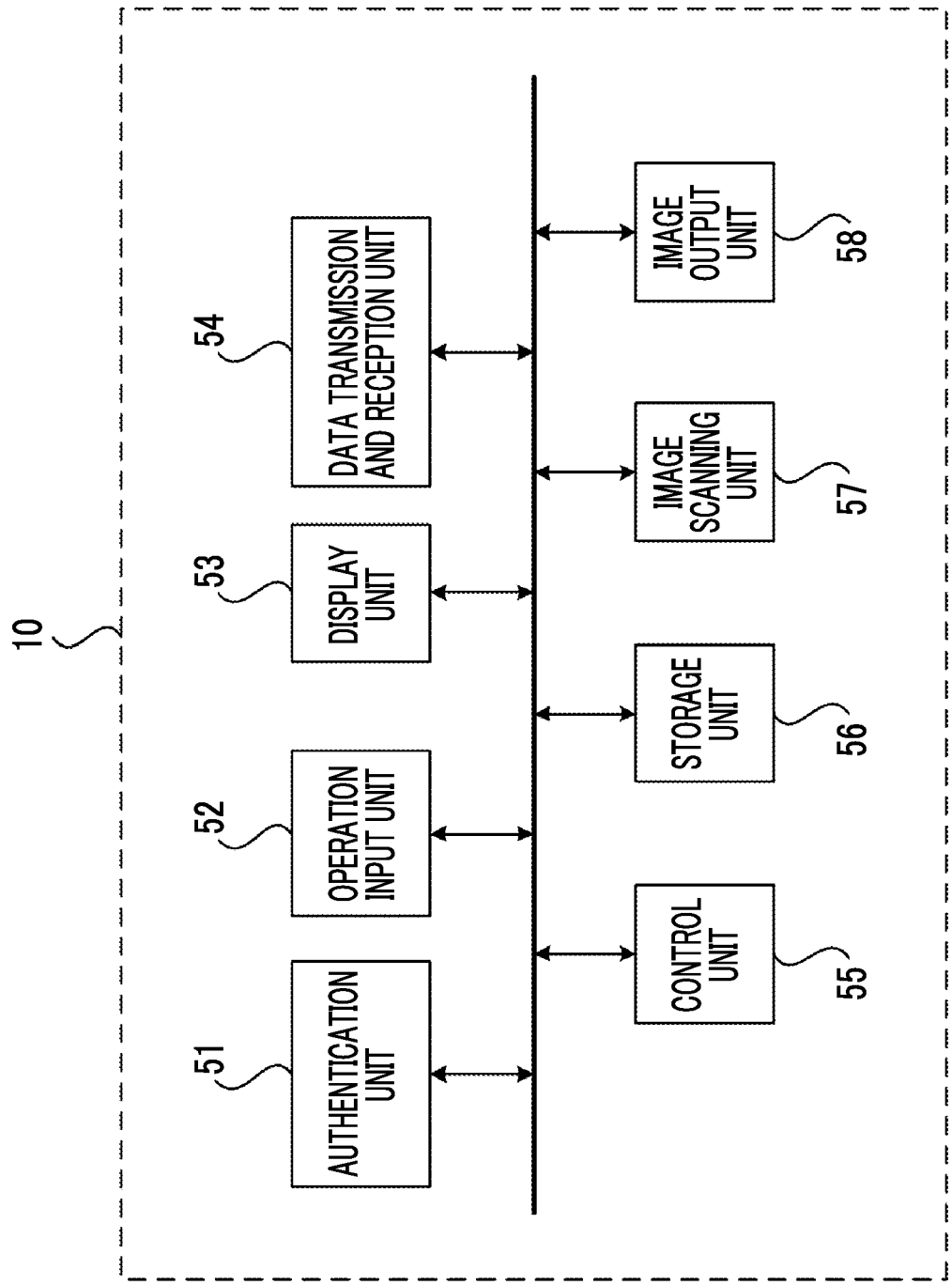
FIG. 3 is a block diagram illustrating a functional configuration of the image forming apparatus of the exemplary embodiment of the present invention.

FIG. 3 is a block diagram illustrating a functional configuration of the image forming apparatus 10 implemented by executing the control program.

As illustrated in FIG. 3, the image forming apparatus 10 of the present exemplary embodiment includes an authentication unit 51, an operation input unit 52, a display unit 53, a data transmission and reception unit 54, a control unit 55, a storage unit 56, an image scanning unit 57, and an image output unit 58.

The authentication unit 51 executes an authentication process for a user who wants to utilize the image forming apparatus 10. The operation input unit 52 inputs information about various operations performed by the user. The display unit 53 is controlled by the control unit 55 and displays various information to the user. The data transmission and reception unit 54 transmits and receives data to and from the external apparatus such as the terminal apparatus 20.

The control unit 55 controls an overall operation of the image forming apparatus 10 and performs a control of scanning an original document image by the image scanning unit 57, a control of outputting the printing data from the image output unit 58, and the like based on the instruction input from the user.

The storage unit 56 stores not only the control program but also data such as a utilized function management table. The utilized function management table will be described in detail later.

The image scanning unit 57 scans the original document image from the loaded original document under control of the control unit 55. The image output unit 58 outputs the image onto the recording medium such as a printing paper sheet under control of the control unit 55.

In the image forming system of the present exemplary embodiment, the image forming apparatus 10 is utilized at the home of the user. Thus, in a case where a defect occurs in the image forming apparatus 10, the manager user cannot immediately check the image forming apparatus 10, and the user needs to first respond to the defect.

Thus, the control unit 55 acquires information related to a function utilized by the user and refers to the acquired information. In the occurrence of the defect in the image forming apparatus 10, in a case where the defect is a defect that does not affect the function utilized by the user, the control unit 55 does not provide a notification of the defect to the user or provides a notification indicating that the defect does not affect the function utilized by the user to the user.

Hereinafter, a process in a case where the defect occurs in the image forming apparatus 10 of the present exemplary embodiment will be described in detail. FIG. 4 is a diagram illustrating an example of the utilized function management table managed in the image forming apparatus 10.

The utilized function management table is a table in which the information related to the function utilized by the user is managed. In the utilized function management table, whether each function is a function utilized by the user or a function not utilized is set as illustrated in FIG. 4. In the image forming apparatus 10, the utilized function management table is stored in advance in the storage unit 56.

Here, for the utilized function management table, the image forming apparatus 10 in a state where the manager user sets and stores the utilized function management table in advance in the storage unit 56 may be rented to the user.

In addition, the image forming apparatus 10 in a state where the utilized function management table is not stored may be rented to the user, and the user may set the utilized function management table after the image forming apparatus 10 is installed at the home of the user.

In addition, the image forming apparatus 10 in a state where the utilized function management table is not stored may be rented to the user, and the manager user may remotely set the utilized function management table from the terminal apparatus 30 after the image forming apparatus 10 is installed at the home of the user.

In a case where the image forming apparatus 10 in a state where the utilized function management table is stored is rented to the user, or in a case where the user sets the utilized function management table, the present invention can also be applied to a state where the terminal apparatus 30 is not connected to the Internet 40.

In a case where the defect occurs in the image forming apparatus 10, the control unit 55 refers to the utilized function management table stored in the storage unit 56. In a case where the defect is a defect that does not affect the function utilized by the user, the notification of the defect is not provided to the user, or the notification indicating that the defect does not affect the function utilized by the user is provided to the user.

Here, the notification indicating that the defect does not affect the function utilized by the user may be provided in any form.

For example, the notification indicating that the defect does not affect the function utilized by the user may be displayed on the display unit of the image forming apparatus 10 or a display unit of the terminal apparatus 20 utilized by the user. As illustrated in FIG. 5 as an example, in a case where a defect of the scanning function occurs as the defect not affecting the function utilized by the user, a notification such as "Scanning function cannot be currently utilized. Please contact manager. Printing function can still be utilized." may be displayed.

In addition, an indicator that indicates the defect may be provided in the image forming apparatus 10. For example, in a case where the defect does not affect the function utilized by the user, the indicator may be lit in orange. In a case where the defect affects the function utilized by the user, the indicator may be lit in red. In addition, the notification may be provided by transmitting an email to the user.

Hereinafter, an example of a process in a case where the defect occurs in the image forming apparatus 10 will be described. For example, as illustrated in FIG. 4, the utilized function management table is assumed to be set such that the user utilizes the printing function and the copying function and does not utilize the other functions such as the fax function, a scanning and fax function, and the scanning function.

In this state, in the image forming apparatus 10, in a case where a defect that affects the scanning function is detected, the control unit 55 refers to the utilized function management table stored in the storage unit 56. As a result of referring to the utilized function management table, the control unit 55 does not provide the notification of the defect to the user since the defect of the scanning function is not a defect affecting the function utilized by the user.

Furthermore, under such a situation, in a case where the user wants to utilize the scanning function because of a sudden matter, the scanning function cannot be utilized in the image forming apparatus 10 because of the defect occurring in the scanning function. Even in this case, a notification such as "Scanning function cannot be currently utilized. Please contact manager. Printing function can still be utilized." may be displayed as illustrated in FIG. 5.

In the present exemplary embodiment, in the occurrence of the defect in the image forming apparatus 10, in a case where the defect is a defect affecting the function utilized by the user, the control unit 55 may provide the notification of the defect to the user.

For example, as illustrated in FIG. 4, the utilized function management table is assumed to be set such that the user utilizes the printing function and the copying function and does not utilize the other functions such as the fax function, the scanning and fax function, and the scanning function.

In this state, in the image forming apparatus 10, in a case where a defect that affects the printing function is detected, the control unit 55 refers to the utilized function management table stored in the storage unit 56. As a result of referring to the utilized function management table, the control unit 55 provides the notification of the defect to the user since the defect of the printing function is a defect affecting the function utilized by the user.

The notification in this case may be provided in any form. For example, the notification may be provided by transmitting an email to the user, or the notification may be displayed on the display unit of the terminal apparatus 20 utilized by the user.

In addition, in a case where the defect not affecting the function utilized by the user occurs in the image forming apparatus 10, the control unit 55 may provide the notification of the defect to the manager user. In this case, the manager user may request a repair of the image forming apparatus 10 prior to a return of the image forming apparatus 10 while causing the user to continue utilizing the image forming apparatus 10. In addition, in a case where the defect affecting the function utilized by the user occurs in the image forming apparatus 10, the control unit 55 may provide the notification of the defect to the manager user.

Here, the notification to the manager user may be provided in any form. For example, the notification may be provided by transmitting an email to the manager user, or the notification may be displayed on a display unit of the terminal apparatus 30 utilized by the manager user.

In addition, the information related to the function utilized by the user may be information indicating a function utilized by the user in the past in the image forming apparatus 10 or another image forming apparatus. For example, the user is assumed to have utilized only the printing function and the copying function in an operation history in which the user utilized the image forming apparatus in the past in a facility of the organization to which the user belongs. In this case, in the utilized function management table, only the printing function and the copying function may be set to be utilized, and the other functions may be set to be not utilized.

In addition, the information related to the function utilized by the user may be information indicating a function that is utilized by the user a predetermined number of times or more or with a predetermined frequency or higher among functions utilized by the user in the past in the image forming apparatus 10 or another image forming apparatus.

For example, the user is assumed to have utilized the printing function and the copying function 10 times or more and have utilized the other functions less than 10 times in the operation history in which the user utilized the image forming apparatus in the past in the facility of the organization to which the user belongs. In this case, in the utilized function management table, only the printing function and the copying function may be set to be utilized, and the other functions may be set to be not utilized.

Figure 6:
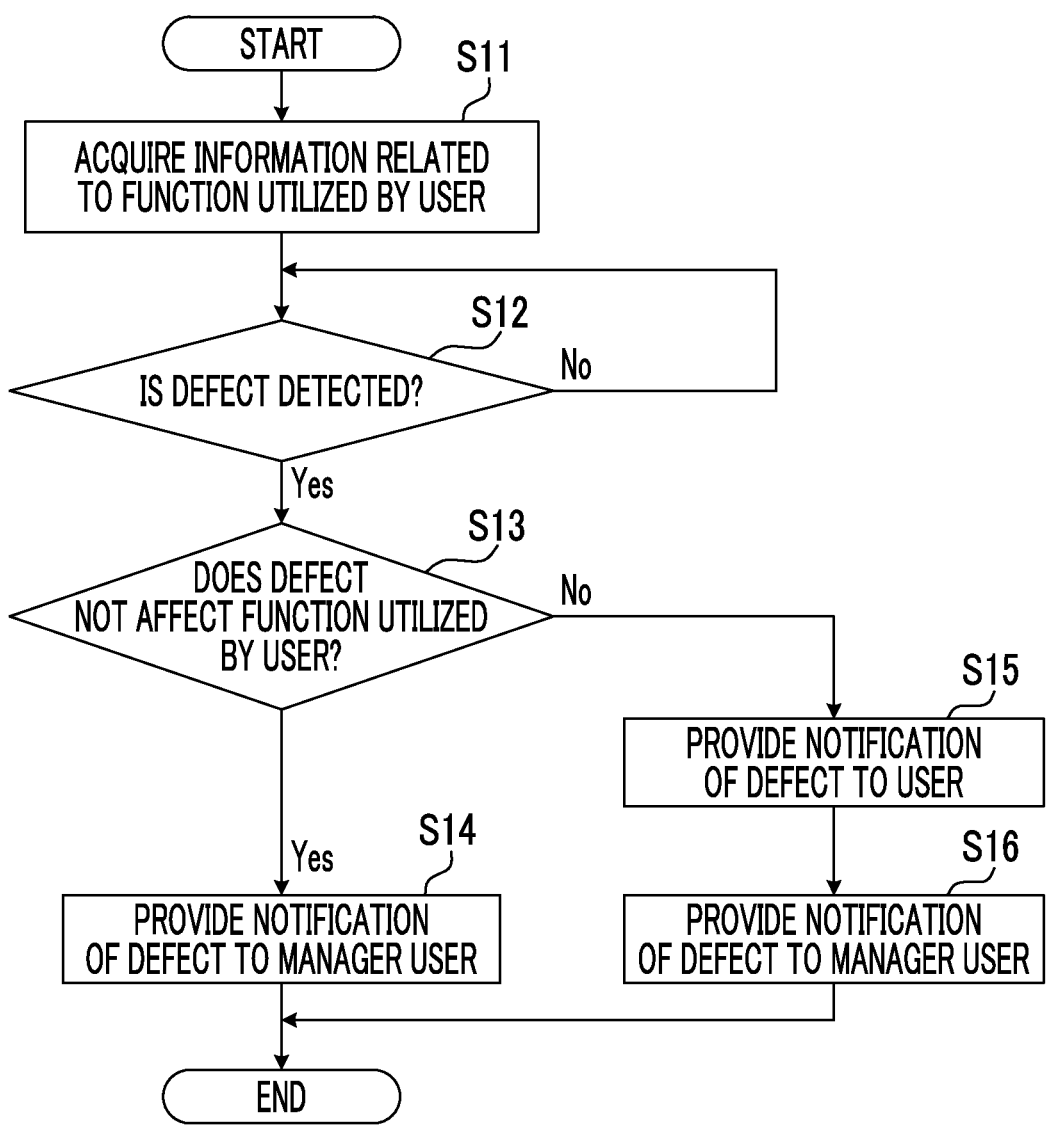
FIG. 6 is a flowchart for describing a flow of process in a case where a defect occurs in the image forming apparatus of the exemplary embodiment of the present invention.

Next, a flow of process in a case where a defect occurs in the image forming apparatus 10 of the present exemplary embodiment will be described with reference to the flowchart in FIG. 6.

In step S11, the control unit 55 acquires and stores the utilized function management table in the storage unit 56 as the information related to the function utilized by the user.

Next, in step S12, the control unit 55 determines whether or not a defect is detected in the image forming apparatus 10.

In step S12, in a case where a determination that a defect is not detected in the image forming apparatus 10 is made, the control unit 55 executes step S12 again. That is, the control unit 55 repeats step S12 until a defect is detected in the image forming apparatus 10.

In step S12, in a case where a determination that a defect is detected in the image forming apparatus 10 is made, the control unit 55 refers to the utilized function management table and determines whether or not the defect detected in step S12 is a defect not affecting the function utilized by the user in step S13.

In step S13, in a case where a determination that the defect does not affect the function utilized by the user is made, the control unit 55 provides the notification of the defect to only the manager user in step S14 without providing the notification of the defect to the user and finishes the process.

In step S13, in a case where a determination that the defect is not a defect not affecting the function utilized by the user, that is, the defect affects the function utilized by the user, is made, the control unit 55 provides the notification of the defect to the user in step S15.

Furthermore, the control unit 55 also provides the notification of the defect to the manager user in step S16 and finishes the process.

Next, examples of the image forming system of the present exemplary embodiment will be described.

Example 1

Figure 7:
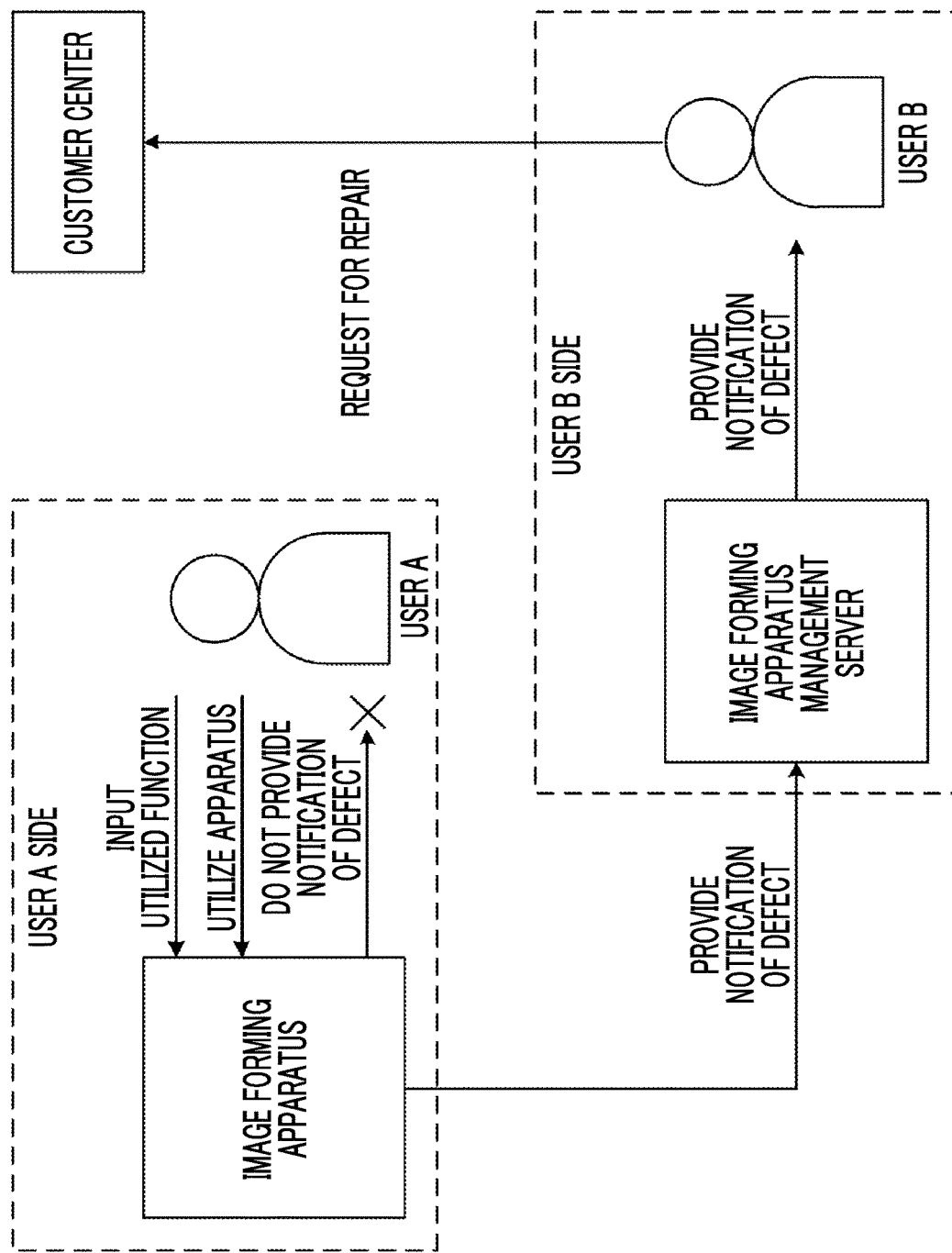
FIG. 7 is a diagram illustrating a configuration of an image forming system of Example 1 of the present invention.

An example of occurrence of an error related to the scanning function not utilized during utilization of the image forming apparatus by a user A who works from home and generally utilizes the image forming apparatus for the printing function will be illustrated. A configuration diagram of Example 1 is illustrated in FIG. 7.

In this example, the user A brings the image forming apparatus to home and utilizes the image forming apparatus in order to work from home. The user A is registered in advance in the utilized image forming apparatus using a user authentication function. The user A performs authentication of the image forming apparatus before utilizing the image forming apparatus and then, utilizes the image forming apparatus.

In addition, in order to check a utilization situation and a utilization fee of the image forming apparatus, a user B who is a manager of the image forming apparatus remotely monitors a state of the image forming apparatus via an image forming apparatus management server for managing the image forming apparatus.

The user A registers a function to utilize in advance in the utilized function management table in the image forming apparatus. In the present example, since the user A utilizes only the printing function, a function related to the printing function is registered. The image forming apparatus records the utilized function management table input by the user A in association with authentication information of the user A.

The user A brings the image forming apparatus to home and starts utilizing the image forming apparatus. Here, the image forming apparatus detects a defect of a hardware malfunction of the apparatus related to the scanning function.

From a type of the detected defect and the function utilized by the user A currently utilizing the image forming apparatus, the image forming apparatus determines not to provide the notification of the defect on the display unit of the image forming apparatus. On the other hand, since the hardware malfunction that requires replacement of the apparatus is detected, the image forming apparatus provides the notification of the defect of the hardware malfunction of the apparatus related to the scanning function to the image forming apparatus management server managed by the user B who is the manager of the image forming apparatus.

The user B who perceives the occurrence of the defect in the image forming apparatus of the user A via the image forming apparatus management server requests a repair of the image forming apparatus at an end of utilization of the user A to a customer center.

Accordingly, the user A can continue utilizing the image forming apparatus, and the user B can request a repair of the malfunctioning image forming apparatus.

In the present example, while the user B requests the repair to the customer center, the image forming apparatus can also manage a utilization period of the user A and request the repair of the image forming apparatus at the end of the utilization of the user A to the customer center.

Example 2

An error display example in a case where the user A needs to utilize the scanning function because of a sudden matter in the configuration of Example 1 in a state where the scanning function cannot be utilized in the image forming apparatus will be illustrated.

While the user A normally does not utilize the scanning function for work, the user A needs the scanning function because of a sudden matter and wants to utilize the scanning function.

However, since the scanning function cannot be utilized because of the hardware malfunction of the apparatus related to the scanning function in the image forming apparatus, a notification indicating that the scanning function cannot be currently utilized is displayed on the display unit of the image forming apparatus as illustrated in FIG. 5.

In a case where the user A determines that the scanning function cannot be utilized and returns to a previous screen in the image forming apparatus, the notification indicating the defect is deleted.

As in the present example, even for a function not registered in the utilized function management table, the user may be permitted to utilize the function. In a case where the function cannot be utilized because of the defect occurring in the image forming apparatus, the notification indicating the defect is displayed.

Example 3

Figure 8:
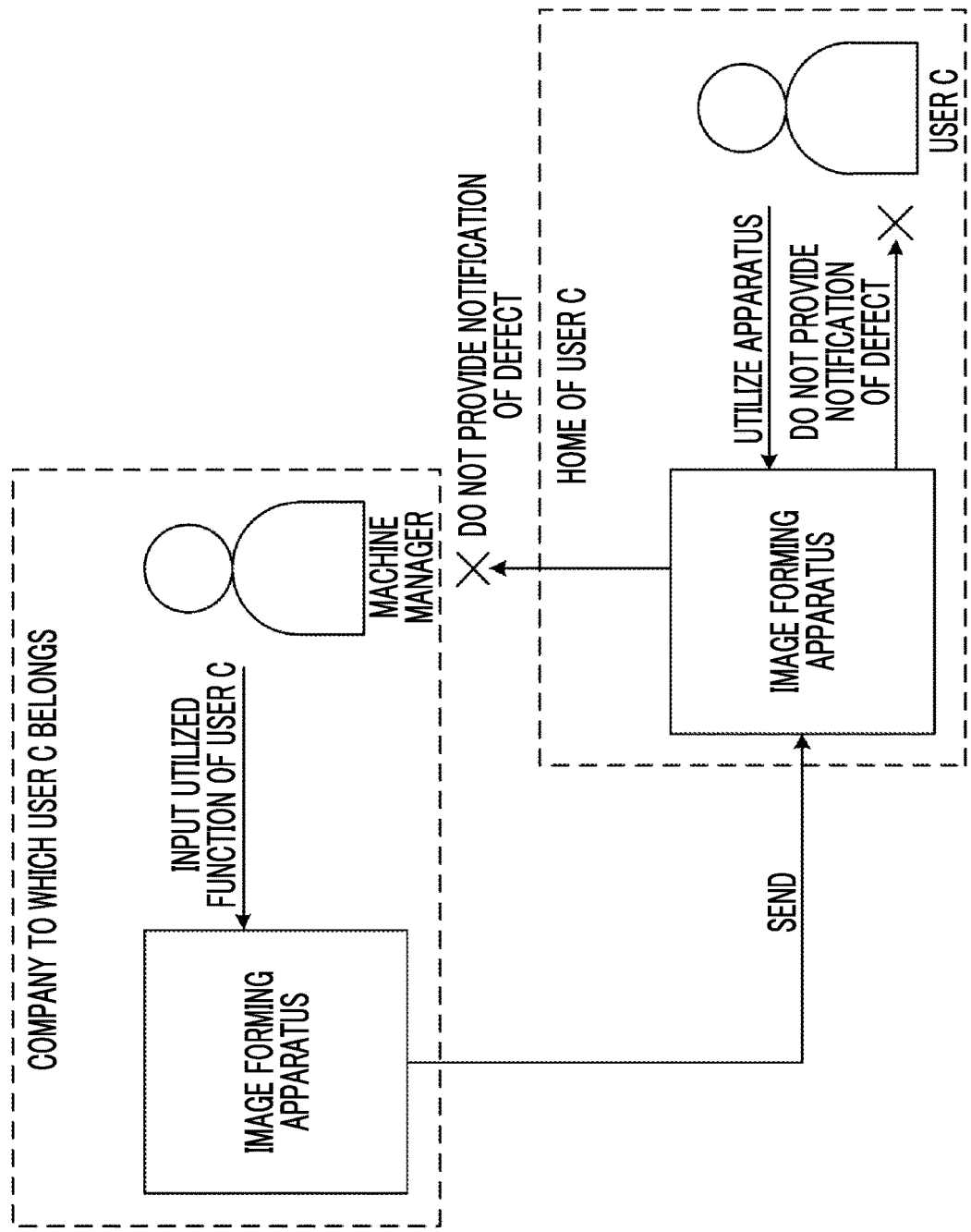
FIG. 8 is a diagram illustrating a configuration of an image forming system of Example 3 of the present invention.

An example of occurrence of an error related to the scanning function not utilized during utilization of the image forming apparatus by a user C who works from home in an environment not connectable to a network and utilizes the image forming apparatus will be illustrated. A configuration diagram of Example 3 is illustrated in FIG. 8.

In a company for which the user C works, the image forming apparatus is assumed to be managed by a machine manager. However, a network line is not present at home of the user C, and there is no means for contacting the machine manager.

The image forming apparatus utilized in the company for which the user C works is assumed to be brought to the home of the user C and utilized by directly connecting the image forming apparatus to a terminal apparatus. In addition, the user C is assumed to be a user who cannot set the image forming apparatus by oneself.

In this case, first, the machine manager sets a state where the image forming apparatus can be utilized. Next, the machine manager asks the user C about the utilized function, inputs the utilized function into the image forming apparatus based on an answer of the user C, and sends the image forming apparatus to the home of the user C. Accordingly, a state where the user C can utilize the image forming apparatus at home is set.

Special setting is not required from a viewpoint of the user C, and a state where the image forming apparatus can be utilized can be set by only hearing from the machine manager.

After the user C starts utilizing the image forming apparatus, the image forming apparatus detects the defect of the hardware malfunction of the apparatus related to the scanning function. From the type of the detected defect and the function utilized by the user C currently utilizing the image forming apparatus, the image forming apparatus determines not to provide the notification of the defect on the display unit of the image forming apparatus. Since the notification of the defect is not provided, the user C can continue utilizing the printing function as usual.

As in this case of working from home, the present system can also be applied to an image forming apparatus that is utilized alone in a state where the image forming apparatus is not connected to the machine manager.

Modification Example

While the image forming system of the exemplary embodiment of the present invention is described above, the present invention is not limited to the exemplary embodiment and can be appropriately changed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, while the exemplary embodiment is described using a case of applying the present invention to the image forming apparatus, the present invention is not limited thereto and can be applied to various information processing apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      acquire information related to a function utilized by a user;
      refer to the acquired information and, in a case where a defect occurs in the information processing apparatus and the defect is a defect not affecting the function utilized by the user, do not provide a notification of the defect to the user or provide a notification indicating that the defect does not affect the function utilized by the user to the user; and
      in a case where a defect occurs in the information processing apparatus and the defect is a defect affecting the function utilized by the user, provide a notification of the defect to the user.

2. The information processing apparatus according to claim 1, wherein the processor is configured to:
   in a case where a defect not affecting the function utilized by the user occurs in the information processing apparatus, provide a notification of the defect to a manager user.

3. The information processing apparatus according to claim 1, wherein the processor is configured to:
   in a case where a defect not affecting the function utilized by the user occurs in the information processing apparatus, provide a notification of the defect to a manager user.

4. The information processing apparatus according to claim 2, wherein the processor is configured to:
   in a case where a defect affecting the function utilized by the user occurs in the information processing apparatus, provide a notification of the defect to the manager user.

5. The information processing apparatus according to claim 3, wherein the processor is configured to:
   in a case where a defect affecting the function utilized by the user occurs in the information processing apparatus, provide a notification of the defect to the manager user.

6. The information processing apparatus according to claim 1,
   wherein the information related to the function utilized by the user is information indicating a function that is utilized by the user in the past in the information processing apparatus or another information processing apparatus.

7. The information processing apparatus according to claim 1,
   wherein the information related to the function utilized by the user is information indicating a function that is utilized by the user in the past in the information processing apparatus or another information processing apparatus.

8. The information processing apparatus according to claim 2,
   wherein the information related to the function utilized by the user is information indicating a function that is utilized by the user in the past in the information processing apparatus or another information processing apparatus.

9. The information processing apparatus according to claim 3,
   wherein the information related to the function utilized by the user is information indicating a function that is utilized by the user in the past in the information processing apparatus or another information processing apparatus.

10. The information processing apparatus according to claim 4,
    wherein the information related to the function utilized by the user is information indicating a function that is utilized by the user in the past in the information processing apparatus or another information processing apparatus.

11. The information processing apparatus according to claim 5,
    wherein the information related to the function utilized by the user is information indicating a function utilized by the user in the past in the information processing apparatus or another information processing apparatus.

12. The information processing apparatus according to claim 6,
wherein the information related to the function utilized by the user is information indicating a function that is utilized by the user a predetermined number of times or more or with a predetermined frequency or higher among functions utilized by the user in the past in the information processing apparatus or another information processing apparatus.

13. The information processing apparatus according to claim 7,
wherein the information related to the function utilized by the user is information indicating a function that is utilized by the user a predetermined number of times or more or with a predetermined frequency or higher among functions utilized by the user in the past in the information processing apparatus or another information processing apparatus.

14. The information processing apparatus according to claim 8,
wherein the information related to the function utilized by the user is information indicating a function that is utilized by the user a predetermined number of times or more or with a predetermined frequency or higher among functions utilized by the user in the past in the information processing apparatus or another information processing apparatus.

15. The information processing apparatus according to claim 9,
wherein the information related to the function utilized by the user is information indicating a function that is utilized by the user a predetermined number of times or more or with a predetermined frequency or higher among functions utilized by the user in the past in the information processing apparatus or another information processing apparatus.

16. The information processing apparatus according to claim 10,
wherein the information related to the function utilized by the user is information indicating a function that is utilized by the user a predetermined number of times or more or with a predetermined frequency or higher among functions utilized by the user in the past in the information processing apparatus or another information processing apparatus.

17. The information processing apparatus according to claim 11,
wherein the information related to the function utilized by the user is information indicating a function that is utilized by the user a predetermined number of times or more or with a predetermined frequency or higher among functions utilized by the user in the past in the information processing apparatus or another information processing apparatus.

18. A non-transitory computer readable medium storing a program causing a computer to execute a process comprising:
acquiring information related to a function utilized by a user;
referring to the acquired information and, in a case where a defect occurs in the information processing apparatus and the defect is a defect not affecting the function utilized by the user, not providing a notification of the defect to the user or providing a notification indicating that the defect does not affect the function utilized by the user to the user; and
in a case where a defect occurs in the information processing apparatus and the defect is a defect affecting the function utilized by the user, provide a notification of the defect to the user.

19. An information processing method comprising:
acquiring information related to a function utilized by a user;
referring to the acquired information and, in a case where a defect occurs in the information processing apparatus and the defect is a defect not affecting the function utilized by the user, not providing a notification of the defect to the user or providing a notification indicating that the defect does not affect the function utilized by the user to the user; and
in a case where a defect occurs in the information processing apparatus and the defect is a defect affecting the function utilized by the user, provide a notification of the defect to the user.

* * * * *